Oct. 21, 1969   E. A. MEYER   3,473,773
BRACKET ASSEMBLY
Filed Jan. 10, 1968
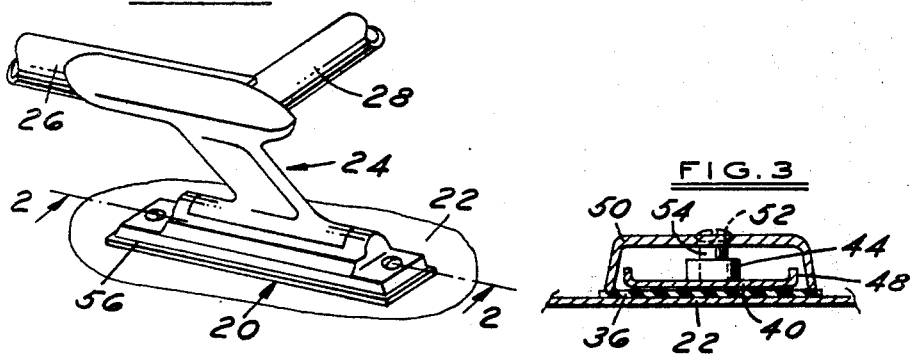
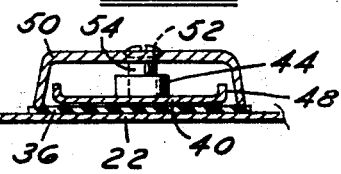
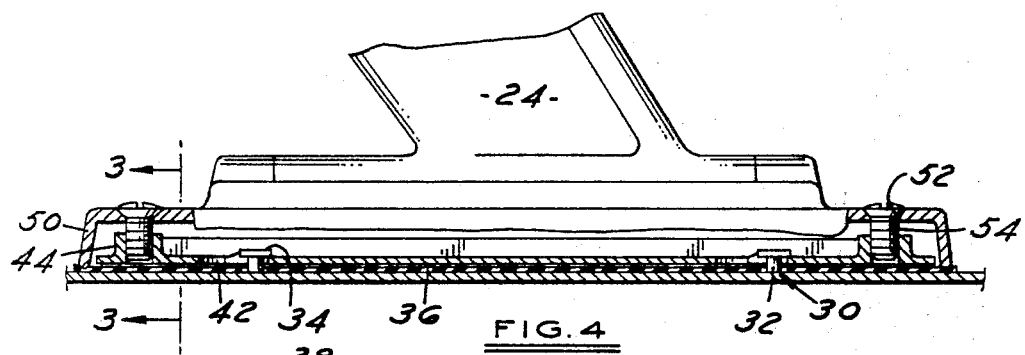
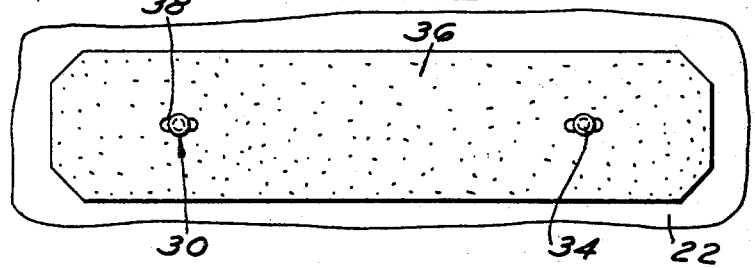
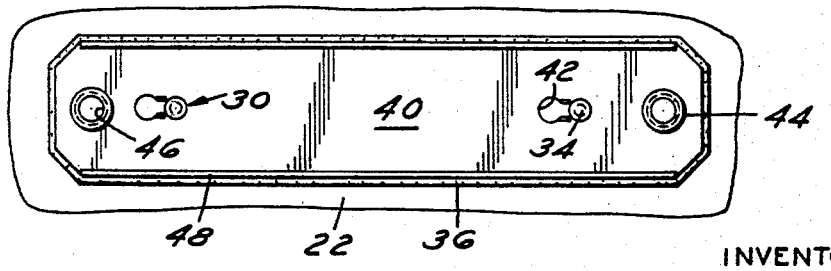
INVENTOR
ENGELBERT A. MEYER
BY
*Burton & Parker*
ATTORNEYS United States Patent Office 3,473,773
Patented Oct. 21, 1969

3,473,773
BRACKET ASSEMBLY
Engelbert A. Meyer, Union Lake, Mich., assignor to Warren Fastener Corporation, Mount Clemens, Mich., a corporation of Michigan
Filed Jan. 10, 1968, Ser. No. 696,820
Int. Cl. B60r 9/04
U.S. Cl. 248—225       8 Claims

ABSTRACT OF THE DISCLOSURE

A bracket assembly, including; a support having headed buttons secured to the surface thereof, a plate secured to the support beneath the head portion of the buttons having threaded apertures, a hollow bracket received on the support over the plate having apertures co-axially aligned with the threaded apertures in the plate, a resilient gasket disposed between the bracket and the support, and threaded screws received through the apertures in the bracket in threaded engagement with the threaded apertures in the plate, tensioning the bracket against the resilient gasket and the plate beneath the head portion of the buttons.

Field of the invention

This invention relates to a specially mounted bracket assembly, suitable for mounting an automotive roof luggage carrier, or the like.

Description of the prior art

The bracket assembly for a conventional car top carrier is generally secured directly to the car top by a plurality of screws which extend through the top. The assembly may include a synthetic rubber grommet which is received in the aperture provided in the car top to seal the aperture and reduce the deformation of the panel. Electrolytic corrosion still occurs, however, at the metal interface, and the assembly may leak after deterioration of the grommet. Examples of car top carrier assemblies shown by the prior art, including the following United States patents: 3,120,914; 3,171,578; 3,223,301; 3,223,302; 3,253,755; and 3,325,067.

The bracket assemblies shown by the prior art for automotive rear vision mirrors are also secured to the automotive panel, however a clip may be provided within the bracket which interconnects the bracket to the automotive panel. Examples of brackets for automotive rear vision mirrors include the following United States patents: 2,505,588; 2,533,475; 2,710,161; and 3,188,038.

The bracket assembly of my invention was particularly, although not exclusively, developed to utilize the improved weld on fastener system, which is disclosed in United States Letters Patent 3,153,468, and is assigned to the assignee of the instant application. In the weld on fastener method, a button is welded to steel, or adhesively bonded to various materials including steel, thereby eliminating the corrosion problems inherent in previously used techniques requiring a hole through the support. The button of the weld on system is small, when compared to previously employed fasteners in the automotive field. A suitable size button, presently used in the mass production of automobiles, involves a button which is 0.200 inch in diameter at its head, 0.160 inch in height; the diameter of the shank being slightly greater than one-half the diameter of the head. A clip or adaptor is then secured to the button, and the component to be attached to the automotive body is secured to the clip or adaptor. A need has, however, remained for a bracket assembly which is positively attached to the automotive panel, and which can withstand shock and vibrational loading, such as is inherent in car top carriers and rear vision mirrors. The primary object of the bracket assembly of my invention is to provide such an assembly, without the requirement of an aperture through the automotive panel.

Summary of the invention

The bracket assembly of my invention includes a support, a plate overlying the support and secured thereto by a headed stud, a hollow bracket received on the support overlying the plate, and a threaded member received through the bracket, threadably tensioning the plate beneath the head of the stud and the bracket against the support. In the preferred embodiment of the bracket assembly of my invention, a resilient gasket is disposed between the bracket and the support which continuously biases the bracket upwardly against the aforesaid threaded engagement. The support may be provided with two studs, which retain the plate to the support, as shown in the disclosed embodiment, and the studs may be secured to the support without perforation of the panel, as disclosed in the above referenced United States Patent No. 3,153,468. In this embodiment, the studs or buttons include a shank portion which is secured to the surface of the support, and a head portion which is spaced therefrom. In the preferred embodiment, the plate is provided with one or more threaded apertures, co-axially aligned with apertures in the hollow bracket, which receive the threaded members. The bracket is preferably provided with keyhole slots which receive the buttons or studs secured to the surface of the support.

The bracket assembly of my invention provides a bracket which is tensioned against the support, or a resilient gasket, to withstand shock or vibrational loading. In the preferred embodiment, there is no metal to metal contact between the bracket and the support, thereby eliminating electrolytic corrosion inherent in conventional car top carriers. The resiliency of the gasket continuously biases the bracket away from the panel, which tightens the engagement between the plate and the buttons or studs. The assembly is simple to install and remove, and the buttons may be left on the surface of the car top for future use, as they are relatively small and do not seriously detract from the appearance of the car.

Brief description of the drawings

FIGURE 1 is a top perspective view of the bracket assembly of my invention utilized to secure an automotive car top carrier;

FIGURE 2 is a side, partially cross sectioned view of the assembly shown in FIGURE 1, in the direction of view arrows 2—2;

FIGURE 3 is an end cross sectional view of the assembly shown in FIGURE 2, in the direction of view arrows 3—3;

FIGURE 4 is a top view of the support, buttons, and gasket shown in FIGURES 1 to 3; and FIGURE 5 is a top view of the assembly shown in FIGURE 4, with the bracket plate.

Description of the preferred embodiment

The partial view of a car top carrier shown in FIGURE 1, includes a bracket assembly 20 secured to the automotive support 22, having a stanchion 24, a side rail 26, and an end rail 28. The stanchion and rail assembly may be of conventional form, as shown in U.S. Patent 3,223,301, or other suitable stanchion embodiments may be utilized. The bracket assembly of my invention may also be utilized in other applications, such as to secure a vehicle rear view mirror, search light, etc., without departing from the purview of my invention.

The embodiment of the bracket assembly 20 illustrated in the remaining figures, includes a support 22 having two headed studs or buttons 30 secured to the surface thereof. The buttons have a shank portion 32 secured to the surface of the support, and an overlying head portion 34 spaced from the plane of the support. In the preferred embodiment of the bracket assembly of my invention, the buttons are secured to the support without perforation, as by welding or adhesive bonding, as described in United States Patent No. 3,153,468. A flat resilient gasket 36, having spaced apertures 38, is received on the support, over the buttons. The apertures may be elongated, as shown, to accommodate variations in the spacing between the buttons.

A plate 40 having spaced keyhole slots 42 is received over the gasket 36, and secured thereto by the buttons 30. The button heads 34 are received through the enlarged openings of the keyhole slots 42, and the plate is shifted to seat the button heads over the slot portions. The bracket plate 40, in this embodiment, is provided with two integral bosses 44, having internally threaded apertures 46, and the lateral edges 48 of the plate have been turned upwardly to provide structural reinforcement.

The hollow body portion 50 of the hollow bracket has a pair of apertures 52 which are co-axially aligned with the threaded apertures 46 of the plate, and a pair of threaded screws 54 are received in the apertures 52, in threaded engagement with the threaded apertures 46 in the plate 40, to tension the plate beneath the button heads 34, and the marginal edges 56 of the bracket against the resilient gasket. It should be noted that the positioning of the screws 54, outside the space buttons 30, provides an exceptionally rigid structure which will withstand shock and vibrational loading. The resilient gasket 36 not only prevents metal to metal contact between the bracket and the support, but also continuously urges the bracket assembly upwardly, against the aforesaid threaded engagement, to provide a secure attachment. Also, the bracket assembly can easily be removed by unthreading the screws 54.

It will be understood by those skilled in the art that various materials may be used in the bracket assembly illustrated in the drawings. The hollow bracket 20 may be formed from cast steel or aluminum, the bracket plate 40 may be formed from cold rolled steel, and the resilient gasket 36 may be formed from a variety of materials including synthetic rubber and various plastics. The buttons 30 of the weld on fasteners are generally formed from stainless steel or cold rolled zinc plated steel, however other suitable materials may be utilized. It will also be understood by those skilled in the art that various modifications may be made to the bracket assembly of my invention without departing from the purview of the appended claims. For example, a single threaded fastener may be utilized by providing an upstanding boss in the center of the bracket plate 40, or two threaded fasteners may be utilized with a single button. The disclosed embodiment, however, provides the strongest assembly. The upstanding bosses 44 may be eliminated by securing a threaded nut to the plate, and other forms of threaded fasteners may be utilized.

What is claimed is:

1. A hollow bracket assembly, including a support, a plate overlying said support having a key hole slot receiving a stud having a head portion overlying said plate, a hollow bracket received on said support overlying said plate, a resilient gasket disposed between said bracket and said support, and a threaded member received through said bracket threadably received in said plate, tensioning said plate beneath the head of said stud, and a head portion tensioning said bracket toward the support against said resilient gasket.

2. The bracket assembly defined in claim 1, characterized in that the head portion of said stud is spaced from the support a distance greater than the thickness of said plate, and the shank portion of said stud is secured to said support without perforation of the support.

3. The bracket assembly defined in claim 1, characterized in that said gasket is a sheet of resilient material having an aperture receiving said stud therethrough, said gasket preventing contact between said plate and said support.

4. A hollow bracket assembly, including a support having at least one headed stud secured to the surface thereof, a plate overlying said support including a key hole slot receiving said headed button and at least one threaded aperture, a hollow bracket received on said support over said plate having an aperture co-axially aligned with the threaded aperture in said plate, and a threaded member received in said aperture in said bracket in threaded engagement with the threaded aperture in said plate having a head portion tensioning the bracket against said support and said plate beneath the head of said stud.

5. The bracket assembly defined in claim 4, characterized in that said assembly includes a resilient gasket disposed between said bracket and said support biasing said support upwardly against the aforesaid threaded engagement.

6. The bracket assembly defined in claim 4, characterized in that said plate includes two key hole slots which receive two headed studs secured to the surface of said support, said key hole slots including an inclined ramp portion preventing withdrawal of the headed buttons.

7. A bracket assembly, comprising: a support, a plate overlying said support and secured thereto by two headed studs received through key hole slots defined in said plate, said plate having two threaded apertures, a threaded bracket member received on said support overlying said plate having two apertures co-axially aligned with the threaded apertures of said plate, a resilient gasket disposed between said bracket and said support, and two threaded members received through the apertures in said bracket in threaded engagement with the threaded apertures of said plate having a head portion tensioning said bracket against said resilient gasket and said plate beneath the head portions of said studs.

8. The bracket assembly defined in claim 7, characterized in that said threaded apertures are spaced on opposite sides of the plate, and said headed studs are spaced therebetween.

References Cited

UNITED STATES PATENTS

| | | | |
|---|---|---|---|
| 2,269,847 | 1/1942 | Feinson | 248—224 |
| 2,628,050 | 2/1953 | Hardwick | 248—224 |
| 2,694,813 | 11/1954 | Cartwright et al. | |
| 3,211,409 | 10/1965 | Zimmermann | 248—224 X |
| 936,527 | 10/1909 | Fisher | 248—223 XR |
| 1,853,104 | 4/1932 | Weiss | 248—22 |
| 2,130,497 | 9/1938 | Hueglin | 248—22 |
| 2,710,161 | 6/1955 | Haberstump | 248—225 XR |
| 3,109,569 | 11/1963 | Hare | 224—42.1 |
| 3,188,038 | 6/1965 | Grout | 248—223 |
| 3,321,168 | 5/1967 | D'Entremont | 248—346 |

ROY D. FRAZIER, Primary Examiner

J. F. FOSS, Assistant Examiner

U.S. Cl. X.R.

248—475; 224—42.1